United States Patent
Maeda

(10) Patent No.: US 8,861,997 B2
(45) Date of Patent: Oct. 14, 2014

(54) ROTARY DRIVING APPARATUS, CONTROL METHOD THEREFOR, STORAGE MEDIUM STORING CONTROL PROGRAM THEREFOR, AND IMAGE FORMING APPARATUS

(71) Applicant: Canon Kabushiki Kaisha, Tokyo (JP)

(72) Inventor: Yoritsugu Maeda, Moriya (JP)

(73) Assignee: Canon Kabushiki Kaisha (JP)

( * ) Notice: Subject to any disclaimer, the term of this patent is extended or adjusted under 35 U.S.C. 154(b) by 65 days.

(21) Appl. No.: 13/764,922

(22) Filed: Feb. 12, 2013

(65) Prior Publication Data
US 2013/0216261 A1    Aug. 22, 2013

(30) Foreign Application Priority Data
Feb. 21, 2012    (JP) .................................. 2012-035052

(51) Int. Cl.
*G03G 15/00*    (2006.01)
*H02P 31/00*    (2006.01)

(52) U.S. Cl.
CPC .............. *G03G 15/757* (2013.01); *H02P 31/00* (2013.01); *G03G 15/5008* (2013.01)
USPC ........................................... 399/36; 399/167

(58) Field of Classification Search
USPC .................................................... 399/36, 167
See application file for complete search history.

(56) References Cited

U.S. PATENT DOCUMENTS

| | | | | |
|---|---|---|---|---|
| 5,565,906 A | * | 10/1996 | Schoon ......................... | 347/248 |
| 7,054,586 B2 | * | 5/2006 | Kuroda ......................... | 399/302 |
| 7,424,255 B2 | * | 9/2008 | Sakai ............................ | 399/301 |
| 2004/0061044 A1 | * | 4/2004 | Soar ......................... | 250/231.13 |
| 2005/0105937 A1 | * | 5/2005 | Sakai ............................ | 399/301 |
| 2005/0137745 A1 | * | 6/2005 | Takayama et al. ............ | 700/230 |
| 2007/0152622 A1 | * | 7/2007 | Komatsu et al. .............. | 318/685 |
| 2007/0290041 A1 | * | 12/2007 | Ruckenstein et al. ........ | 235/454 |
| 2010/0327797 A1 | * | 12/2010 | Maeda .......................... | 318/721 |
| 2011/0176159 A1 | * | 7/2011 | Ohshima et al. ............. | 358/1.14 |
| 2011/0273725 A1 | * | 11/2011 | Milvich ........................ | 356/616 |

FOREIGN PATENT DOCUMENTS

JP    2005-028607 A    2/2005

* cited by examiner

*Primary Examiner* — G. M. Hyder
(74) *Attorney, Agent, or Firm* — Rossi, Kimms & McDowell LLP

(57) ABSTRACT

A rotary driving apparatus that is capable of controlling a rotational speed correctly even when an anomaly occurs. A drive unit rotates a rotating member. A rotating body is rotated with the rotating member. A detection unit detects scales formed on the rotating body. A calculation unit calculates rotation information about the rotating member based on the detection result by the detection unit. A control value setting unit sets a control value to a predetermined value when the rotation information falls outside a predetermined range and a count of determinations that the rotation information falls outside the predetermined range is smaller than a predetermined count, and sets the control value based on the rotation information when the rotation information falls outside the predetermined range and the count of determinations is larger than the predetermined count. A control unit controls the drive unit based on the set control value.

12 Claims, 8 Drawing Sheets

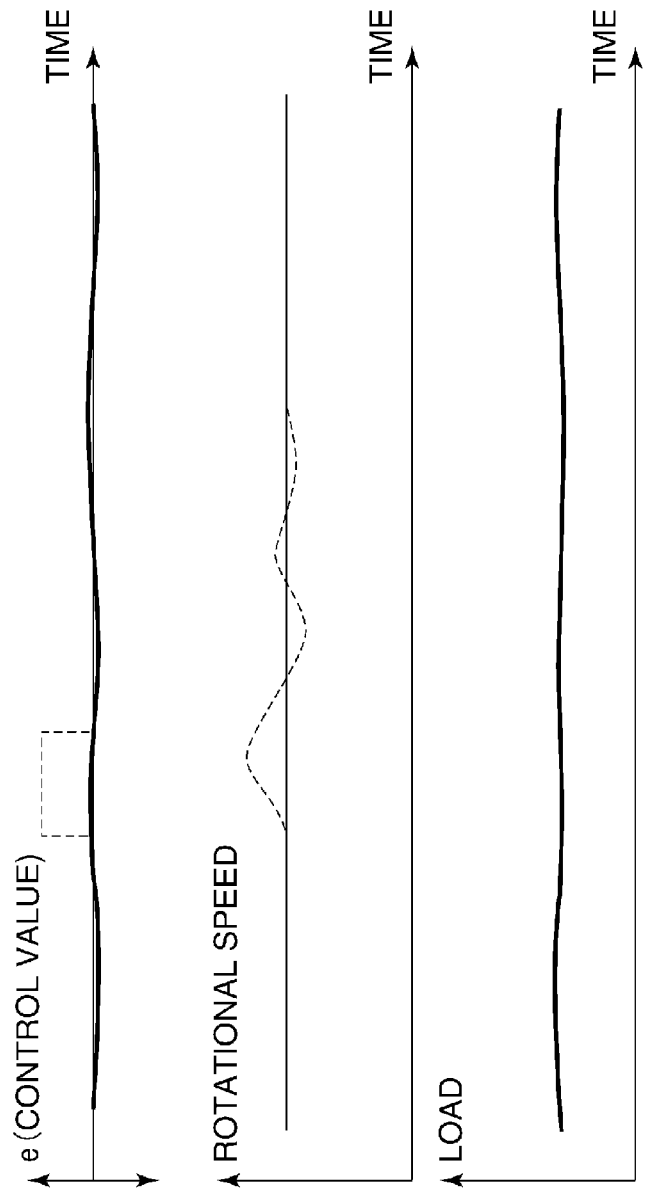

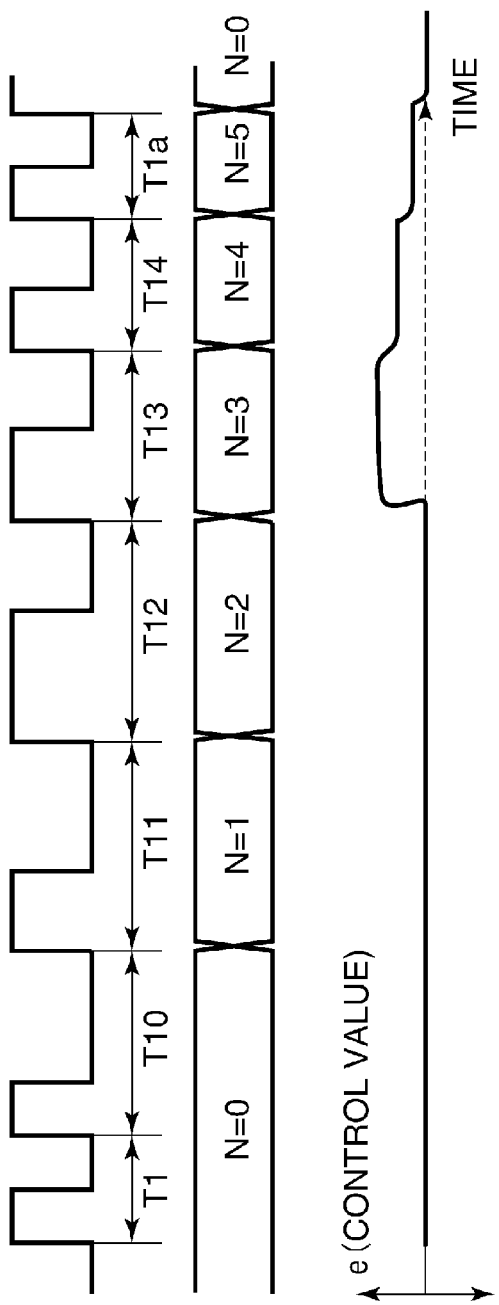
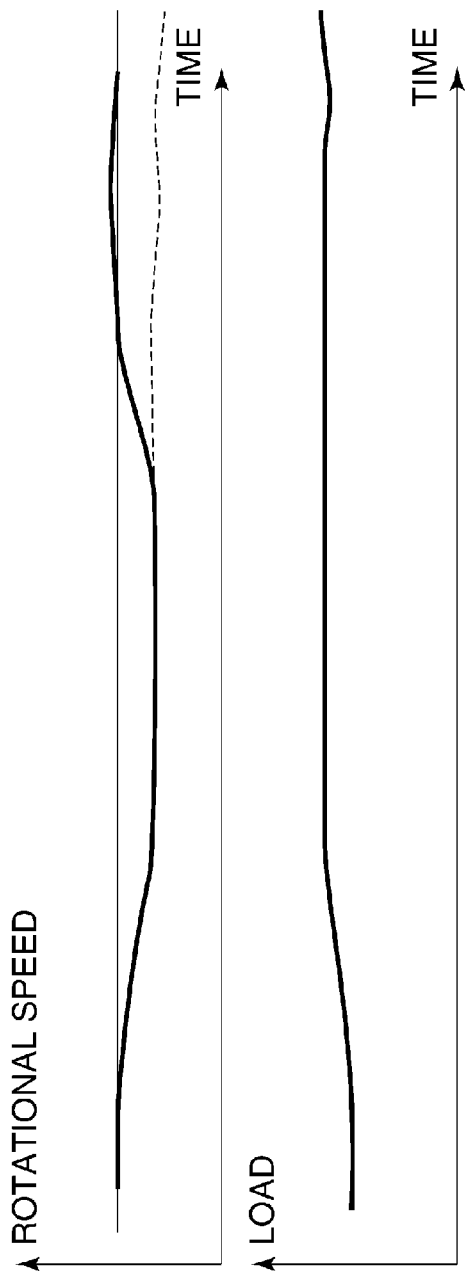
FIG. 9A
FIG. 9B
FIG. 9C
FIG. 9D
FIG. 9E

ROTARY DRIVING APPARATUS, CONTROL METHOD THEREFOR, STORAGE MEDIUM STORING CONTROL PROGRAM THEREFOR, AND IMAGE FORMING APPARATUS

BACKGROUND OF THE INVENTION

1. Field of the Invention

The present invention relates to a rotary driving apparatus that drives a rotating member to rotate, a control method therefor, a storage medium storing a control program therefor, and an image forming apparatus that has the rotary driving apparatus.

2. Description of the Related Art

An electrophotographic image forming apparatus rotates a rotating member, such as a photoconductive drum, at a constant rotational speed (angular velocity). For such a purpose, the apparatus rotates an encoder wheel on which graduations (scales) are marked at equal intervals with the rotating member in one piece, detects the rotating speed of the encoder wheel by detecting the graduations of the encoder wheel with an encoder sensor, and controls a motor that drives the rotating member based on the detected rotating speed.

If a dust particle adheres to the encoder wheel, the encoder sensor mistakes the dust particle for the graduation and outputs a signal (it is referred to as "abnormal periodic signal", hereafter) that is different in a period from a signal corresponding to the actual rotational speed. When the rotation is controlled based on this abnormal periodic signal, it becomes impossible to rotate the rotating member at the constant rotational speed. There is a known method that generates a pseudo-internal signal (it is referred to as a "pseudo-signal") when detecting an anomaly in the period of output signal and controls a motor based on the generated pseudo-signal (see Japanese Laid-Open Patent Publication (Kokai) No. 2005-28607 (JP 2005-28607A)).

The method disclosed in JP 2005-28607A is effective for the case where the period of output signal from the encoder sensor becomes abnormal in spite of the fact that the rotational speed of the rotating member is constant, such as a case where a dust particle adheres to the encoder wheel. However, when the rotational speed of the rotating member actually varies with a change of load etc., the variation in the rotational speed cannot be detected by the method disclosed in JP 2005-28607A, and it becomes impossible to rotate the rotating member at the desired rotational speed.

SUMMARY OF THE INVENTION

The present invention provides a rotary driving apparatus, a control method therefor, a storage medium storing a control program therefor, and an image forming apparatus, which are capable of controlling a rotational speed correctly even when an anomaly occurs in an encoder wheel.

Accordingly, a first aspect of the present invention provides a rotary driving apparatus that drives a rotating member comprising a drive unit configured to rotate the rotating member, a rotating body configured to be rotated with the rotating member, a detection unit configured to detect scales formed on the rotating body, a calculation unit configured to calculate rotation information about the rotating member based on the detection result by the detection unit, a control unit configured to control the drive unit based on a control value, and a control value setting unit configured to set a control value to a predetermined value when the rotation information falls outside a predetermined range and a count of determinations that the rotation information falls outside the predetermined range is smaller than a predetermined count, and to set the control value based on the rotation information when the rotation information falls outside the predetermined range and the count of determinations that the rotation information falls outside the predetermined range is larger than the predetermined count.

Further features of the present invention will become apparent from the following description of exemplary embodiments with reference to the attached drawings.

BRIEF DESCRIPTION OF THE DRAWINGS

FIG. 8A through FIG. 8E are charts showing a first example of a concrete operation (a signal process) of a control value generation unit according to the flowchart shown in FIG. 6.

FIG. 9A through FIG. 9E are charts showing a second example of the concrete operation (the signal process) of the control value generation unit according to the flowchart shown in FIG. 6.

DESCRIPTION OF THE EMBODIMENTS

Hereafter, embodiments according to the present invention will be described in detail with reference to the drawings.

Hereafter, an embodiment will be described with reference to the attached drawings. In this embodiment, a color copying machine (MFP: Multifunction Peripheral) that forms an image on a recording sheet etc. with an electrophotography system is taken up as an image forming apparatus including a rotary driving apparatus.

Figure 1:
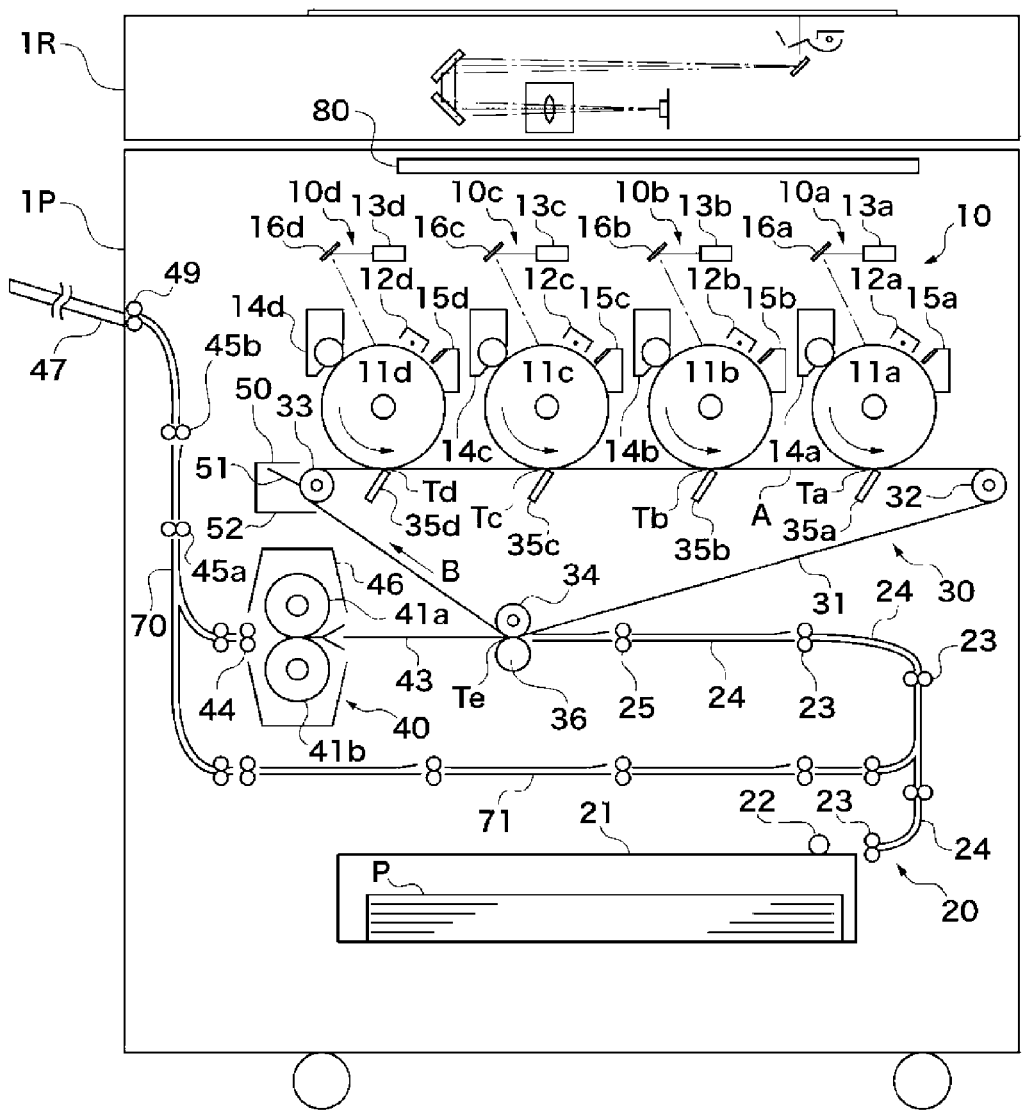
FIG. 1 is a sectional view schematically showing a configuration of a color copying machine (an image forming apparatus) that has a rotary driving apparatus according to an embodiment.

FIG. 1 is a sectional view schematically showing a configuration of the color copying machine that has the rotary driving apparatus according to the embodiment. This color copying machine briefly comprises an image reading section 1R and an image output section 1P. The image reading section 1R reads an original image optically, converts it into an electrical signal, and transmits to the image output section 1P. The image output section 1P has an image forming section 10 in which four image forming units 10a, 10b, 10c, and 10d corresponding to four colors (yellow (Y), cyan (C), magenta (M), and black (B)) are arranged in parallel. The image output section 1P has a sheet feeding unit 20, an intermediate transfer unit 30, a fixing unit 40, a cleaning unit 50, and a control unit (not shown).

Since the image forming units 10a through 10d that constitute the image forming section 10 have the same configurations, the image forming unit 10a will be described as a representative, and the descriptions about the image forming units 10b through 10d are omitted. It should be noted that a photoconductive drum 11b of the image forming unit 10b, a photoconductive drum 11c of the image forming unit 10c, and a photoconductive drum 11d of the image forming unit 10d are equivalent to a photoconductive drum 11a of the image forming unit 10a in FIG. 1, for example. Thus, the symbol that consists of the same reference numeral and the alpha code a, b, c, or d corresponding to each of the image forming units 10a through 10d is attached to an equivalent member in FIG. 1

The photoconductive drum 11a that is an image bearing member is rotatably supported in the image forming unit 10a so as to be rotated in an arrow direction in FIG. 1. It should be noted that the photoconductive drum 11a is an example of the rotating member that is controlled by the rotary driving apparatus concerning this embodiment. The image forming unit 10a has a primary electrostatic charger 12a, a development device 14a, and a cleaning device 15a that are arranged so as to face the outer circumferential surface of the photoconductive drum 11a, and has an optical system 13a that exposes the photoconductive drum 11a, and a turning mirror 16a.

The primary electrostatic charger 12a gives the electric charge of uniform electrification quantity to the surface of the photoconductive drum 11a. In the optical system 13a emits a light beam, such as a laser beam, which is modulated corresponding to an image signal from the image reading section 1R. The light beam exposes the surface of the photoconductive drum 11a via the turning mirror 16a. An electrostatic latent image is formed on the photoconductive drum 11a.

In the image forming unit 10a, a yellow (Y) developer image (a toner image) is formed. That is, the development device 14a develops the electrostatic latent image formed on the photoconductive drum 11a with the yellow (Y) developer (toner), and forms a yellow toner image. The yellow toner image formed on the surface of the photoconductive drum 11a is transferred to an intermediate transfer belt 31 (a belt-shaped image bearing member in the intermediate transfer unit 30) in an image transfer area Ta. That is, the color copying machine concerning this embodiment employs what is called an intermediate transfer system.

It should be noted that the configuration of the intermediate transfer unit 30 will be described below. In the downstream side of the image transfer area Ta around the photosensitive drum 11a, the cleaning device 15a cleans the surface of photoconductive drum 11a by scraping the toner that remains on the photoconductive drum 11a without being transferred to the intermediate transfer belt 31.

When the above-mentioned process is performed in the image forming units 10a through 10d, the toner images of respective colors including yellow (Y), cyan (C), magenta (M), and black (B) are formed, and the toner images of the respective colors are piled up on the intermediate transfer belt 31 at predetermined timings.

The sheet feeding unit 20 has a cassette 21 that stores sheets P, a pickup roller 22 for sending the sheets P one by one from the cassette 21, and a feeding roller pairs 23 for conveying the sheet P picked up by the pickup roller 22. The sheet feeding unit 20 has sheet feeding guides 24 and a registration roller pair 25 for sending the transfer sheets P to a secondary transfer area Te in synchronization with image formation timings in the image forming units 10a through 10d. Although only one cassette 21 is shown in FIG. 1, the color copying machine concerning this embodiment may have a plurality of cassettes 21 for respective sheet sizes.

The intermediate transfer unit 30 has the intermediate transfer belt 31 that is rotated by a driving roller 32. The intermediate transfer belt 31 is looped over a driven roller 33, a secondary transfer opposite roller 34, and the driving roller 32. The drive roller 33 follows to rotation of the intermediate transfer belt 31, and acts as a tension roller that gives a moderate tension to the intermediate transfer belt 31 with energization of a spring (not shown). It should be noted that a primarily transfer plane A is formed between the driving roller 32 and the driven roller 33.

The intermediate transfer belt 31 is made from PI (polyimide), PAI (polyamide imide), for example. The driving roller 32 has a configuration that rubber (urethane or chloroprene) of several millimeters thickness is coated on a surface of metal roller. The rubber prevents slip occurring between the intermediate transfer belts 31 and the driving roller 32. The driving roller 32 is rotated by a driving means (not shown), such as a pulse motor or a DC brushless motor.

Primarily transfer chargers 35a through 35d are arranged at primarily transfer areas Ta through Td at which the photoconductive drums 11a through 11d contact the intermediate transfer belt 31, so as to face the photoconductive drums 11a through 11d across the intermediate transfer belt 31. A secondary transfer roller 36 is arranged against the secondary transfer opposite roller 34, and the secondary transfer area Te is formed at the nip between the intermediate transfer belt 31 and the secondary transfer roller 36. The secondary transfer roller 36 is pressed by a pressing means (not shown) with moderate pressure to the intermediate transfer belt 31.

The cleaning unit 50 is arranged at the downstream side of the secondary transfer area Te in order to clean the image formation side of the intermediate transfer belt 31. The cleaning unit 50 has a cleaning blade 51 for removing the toner on the intermediate transfer belt 31 and a toner collecting box 52 that stores the collected toner.

The fixing unit 40 has a heating roller 41a that has a heat source like a halogen heater built-in and a pressure roller 41b that pressurizes the heating roller 41a. It should be noted that the pressure roller 41b may also have a heat source. The fixing unit 40 has a conveyance guide 43 for guiding a sheet P to the nip position of the roller pair that consists of the heating roller 41a and the pressure roller 41b, and a fixing insulation cover 46 for confining heat inside the fixing unit 40. The sheet P that escaped from the roller pair of the heating roller 41a and the pressure roller 41b is ejected outside the color copying machine through an inner ejecting roller pair 44, longitudinal pass roller pairs 45a and 45b, and an outer ejecting roller pair 49, and is stacked on a sheet ejection tray 47. The sheet P is conveyed to the secondary transfer area Te again through a double-sided sheet feeding guide 71 when performing double-side printing to the sheet P.

The control unit has a CPU that manages overall operations and controls of the color copying machine, a ROM that stores programs executed by the CPU, a RAM that functions as an operation area to which the CPU develops the programs and that functions as a temporal storage for image data, etc.

The image forming operation in the color copying machine will be described below. A series of operations and processes in the color copying machine are totally controlled and executed by the CPU in the control unit.

When the CPU issues an image forming operation start signal, a sheet feeding operation for a sheet P of the selected size starts. When a sheet P is fed from the cassette 21 in FIG. 1, a sheet P is picked up from the cassette 21 by the pickup roller 22. The sheet P is conveyed to the registration roller pair 25 by feeding roller pairs 23 through a gap between the sheet feeding guides 24. At this time, the registration roller pair 25 has stopped and the front end of sheet P bump into the nip position of the registration roller pair 25.

Then, the registration roller pair 25 starts rotating in synchronization with an image formation in the image forming section 10 according to the instruction from the CPU. The rotation start timing of the registration roller pair 25 is set so that the conveyance timing of the sheet P coincides with the conveyance timing of the toner image on the intermediate transfer belt 31 in the secondary transfer area Te.

On the other hand, the image forming units 10a through 10d form toner images according to the process mentioned above, when the image forming operation start signal is issued. A toner image formed on the photoconductive drum 11d at the most upstream side in the rotation direction of the intermediate transfer belt 31 is transferred onto the intermediate transfer belt 31 in the primarily transfer area Td with the primarily transfer charger 35d to which high voltage is impressed. The toner image that is primarily transferred onto the intermediate transfer belt 31 moves to the following primarily transfer area Tc as the intermediate transfer belt 31 rotates. In the image forming unit 10c, the image formation is performed with a delay of conveyance time of the toner image, and a toner image formed on the photoconductive drum 11c is transferred over the toner image that has been primarily transferred onto the intermediate transfer belt 31 in registration. The same process is repeated hereafter, and the toner images of four colors are primarily transferred so that the images are superimposed on the intermediate transfer belt 31.

Then, the sheet P is conveyed to the secondary transfer area Te at the timing when the superimposed four-color toner images formed on the intermediate transfer belt 31 are conveyed the secondary transfer area Te. By impressing the high voltage to the secondary transfer roller 36 at the timing when the sheet P contacts the intermediate transfer belt 31 and the transfer sheet P passes, the superimposed four-color toner images on the intermediate transfer belt 31 are transferred to the surface of the sheet P.

Then, the sheet P is correctly guided to the nip position of the fixing roller with the conveyance guide 43, and the superimposed four-color toner images are fixed to the surface of the sheet P with the heat and the nip pressure of the roller pair of the heating roller 41a and the pressure roller 41b. Finally, the sheet P is conveyed with the inner ejecting roller pair 44, the longitudinal pass roller pairs 45a and 45b, and the outer ejecting roller pair 49, and is ejected and stacked on the sheet ejection tray 47.

Next, operations of the color copying machine in the case of forming an image in both sides to a sheet P will be described. In the following description, the operations that are overlapped with the operation in the case of the above-mentioned single-side printing will not be described.

After the fixing process for the superimposed four-color toner images on the first surface (front surface) of the sheet P is performed like the case of the single-side printing, the sheet P is conveyed with the inner ejecting roller pair 44 and the longitudinal pass roller pair 45a (the longitudinal pass roller pair 45b and the outer ejecting roller pair 49 are also used if needed with reference to the sheet size). After the rear end of sheet P reaches a position that is a predetermined distance away from a position 70 on the conveyance path, the longitudinal pass roller pair 45a stops (the longitudinal pass roller pair 45b and the outer ejecting roller pair 49 also stop if needed with reference to the sheet size), and the conveyance of the sheet P in the reverse direction starts. A mechanism, such as a flapper (not shown), is arranged in the position 70 if needed so that the sheet P may not be conveyed to the fixing unit 40 at this time.

Thus, the sheet P of which the front surface was printed passes through a double-sided sheet feeding guide 71, and is re-conveyed to the sheet feeding guides 24 at the timing when the sheet P does not overlap with another sheet P picked out from the cassette 21, and an image is formed on the second surface (back surface) in the same manner as the first surface. Then, the transfer sheet P is conveyed with the inner ejecting roller pair 44, the longitudinal pass roller pairs 45a and 45b, and the outer ejecting roller pair 49, and is ejected and stacked on the sheet ejection tray 47.

Next, the drive control for the photoconductive drums 11a through 11d that are examples of rotating members will be described in detail. Since the image forming units 10a through 10d have the same configuration as already described, the drive control for the photoconductive drum 11a will be described as a representative.

Figure 2:
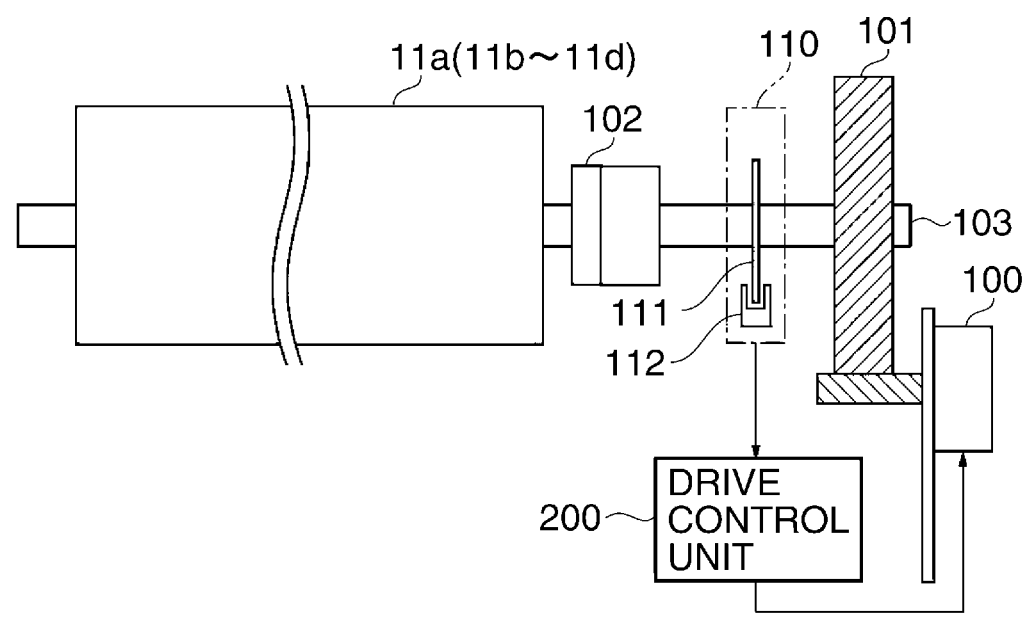
FIG. 2 is a view showing the rotary driving apparatus for a photoconductive drum that is included in the color copying machine shown in FIG. 1.

FIG. 2 is a view showing the rotary driving apparatus for the photoconductive drum 11a. Rotation driving force is transmitted to the photoconductive drum 11a via a coupling 102 from a drum rotating shaft 103 that is a rotating shaft. A drum driving gear 101 and an encoder wheel 111 are fixed to the drum rotating shaft 103. The drum rotating shaft 103, the drum driving gear 101, and the encoder wheel 111 rotate with the same rotational speed (angular velocity).

Figure 7A:
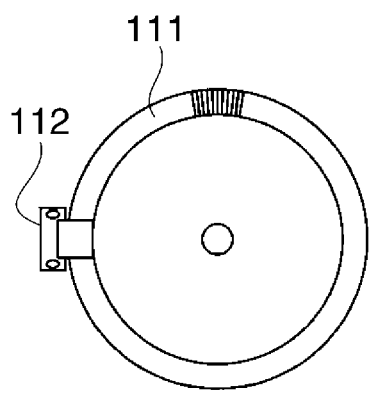
FIG. 7A is a front view showing an encoder unit shown in FIG. 2.

The encoder wheel 111 is a rotating member on which scales (slit patterns) are printed or inscribed at equal intervals (see FIG. 7A). An Encoder unit 110 has the encoder wheel 111 and an encoder sensor 112 that detects the scales of the encoder wheel 111. Although one encoder sensor 112 is arranged to the encoder wheel 111 in this embodiment, a plurality of encoder sensors 112 may be arranged at equiangular intervals around the encoder wheel 111, for example.

A drive control unit 200 is one of the functional blocks of CPU that the control unit of the color copying machine has. The encoder sensor 112 detects the scales of the encoder wheel 111, and supplies rotation information about the drum rotating shaft 103 to the drive control unit 200. The drive control unit 200 sends a driving signal to a drum motor 100 based on the rotation information from the encoder unit 110. The drum motor 100 rotates the drum driving gear 101 according to the driving signal from the drive control unit 200, and thereby, the photoconductive drum 11a rotates.

Figure 3:
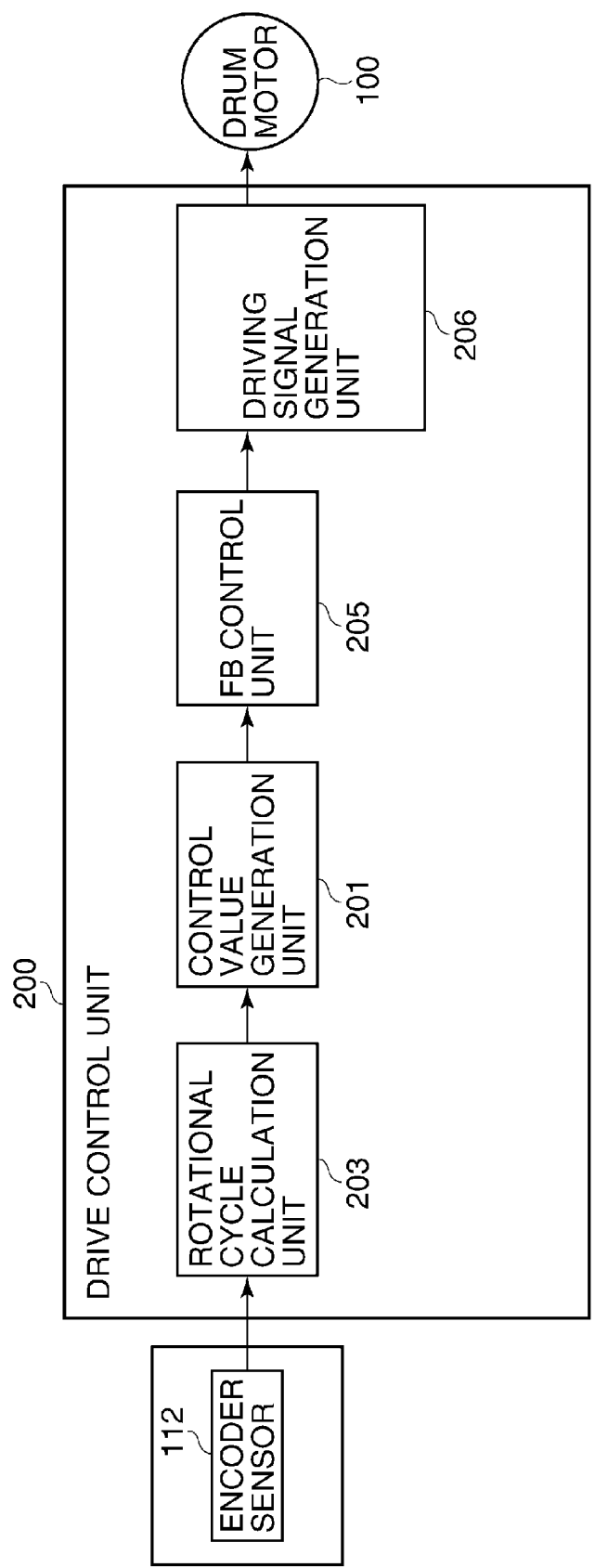
FIG. 3 is a block diagram schematically showing a drive control unit shown in FIG. 2.
Figure 4A:
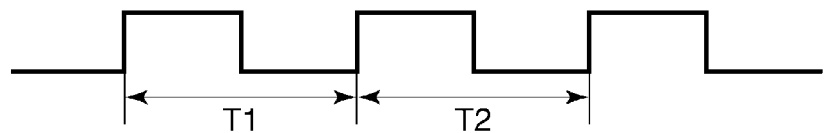
FIG. 4A through FIG. 4C are charts showing various signals that the drive control unit shown in FIG. 3 receives, calculates, and outputs.
Figure 4B:
Figure 4C:

FIG. 3 is a block diagram schematically showing the drive control unit 200. FIG. 4A through FIG. 4C are charts showing various signals that the drive control unit 200 receives, calculates, and outputs. The detection signal outputted from the encoder sensor 112 that detects the scales of the encoder wheel 111 is a pulse signal as shown in FIG. 4A. The pulse signal that is a detection result by the encoder sensor 112 is sent to a rotational cycle calculation unit 203 in the drive control unit 200. The rotational cycle calculation unit 203 functions as a rotation information calculation unit that calculates a rotational cycle as rotation information about the drum rotating shaft 113 based on the received pulse signal. The rotational cycle calculation unit 203 calculates times T1, T2 . . . that are periods between rising edges of the received pulse signal (they are referred to as "calculated periodic value", hereafter) in more detail. Then, a signal (FIG. 4B) of the calculated periodic value and a flag (FIG. 4C) that indicates completion of calculation are outputted to a control value generation unit 201.

When receiving the flag from the rotational cycle calculation unit 203, the control value generation unit 201 calculates a control value to rotate the drum rotating shaft 103 at a target rotational speed (it is referred to as a "target speed", hereafter), based on the calculated periodic value and the target speed of the photoconductive drum 11a. Then, the control value generation unit 201 outputs the calculated control value to a feedback control unit 205 (it is referred to as an "FB control unit 205", hereafter). A method for generating the control value in the control value generation unit 201 will be mentioned later.

The FB control unit 205 calculates a feedback control amount (it is referred to as an "FB control amount", hereinafter) based on the control value received from the control value generation unit 201 and values, such as a feedback gain set beforehand, and outputs the FB control amount to a driving signal generation unit 206. The driving signal generation unit 206 generates a control signal (duty of PWM in this embodiment) proportional to the FB control amount from the FB control unit 205, and uses it as a driving signal for the drum motor 100.

Although the rotational cycle calculation unit 203 calculates the time between the rising edges (the time from a rising edge to the next rising edge) in this embodiment, it may calculate the time from a rising edge to the next falling edge. Instead of this, the time from a falling edge to the next falling edge, the time from a rising edge to a rising edge of a plurality of times ahead, or the like may be calculated.

Figure 5:
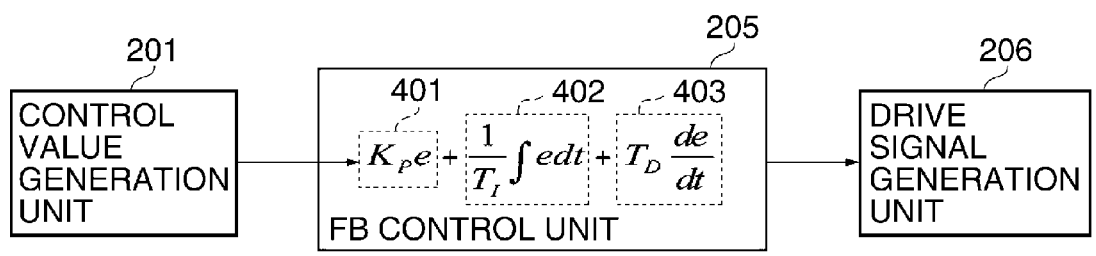
FIG. 5 is a view showing contents of calculations in an FB control unit shown in FIG. 3.

FIG. 5 is a view showing contents of the calculation executed by the FB control unit 205. In this embodiment, the FB control unit 205 shall generate the FB control amount for driving the drum motor 100 by a PID control as an example. Gain values $K_P$, $T_I$, and $T_D$ of the PID control used by the FB control unit 205 are beforehand determined according to the rotational speed and the temporal load change of the drum rotating shaft 103 in this embodiment.

A proportional term 401 as a first term represents a misalignment value of the drum rotating shaft 103 with reference to a target position. An integral term 402 as a second term represents an integral value of the misalignment. And a differential term 403 as a third term represents an instantaneous value of the misalignment. A deviation e is the misalignment of the drum rotating shaft 103 to the target position, and is equivalent to the control value e generated by the control value generation unit 201. In this embodiment, the misalignment of the drum rotating shaft 103 to the target position is detected based on the calculated periodic value that is calculated from the detection signal of the slits formed on the encoder wheel 111.

It should be noted that the control amounts (operation amounts) of these first, second, and third terms are calculated based on the control value outputted from the control value generation unit 201 whenever the rotational cycle calculation unit 203 outputs the flag that indicates the completion of the calculation. The control value generation unit 201 can reset the proportional term 401 and the integral term 402.

Figure 6:
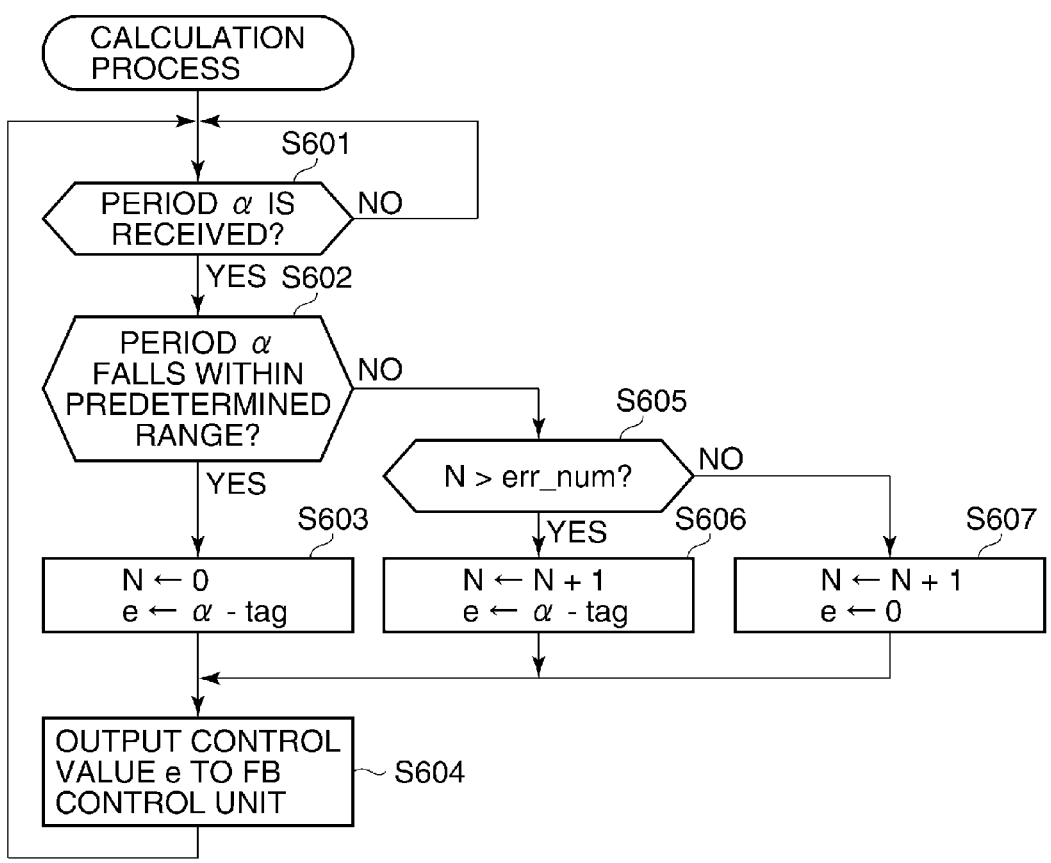
FIG. 6 is a flowchart showing a calculation process executed by a control value generation unit shown in FIG. 3.

FIG. 6 is a flowchart showing a calculation process executed by the control value generation unit 201. When the drive control unit 200 starts driving the drum rotating shaft 103, the control value generation unit 201 determines whether a signal of the calculated periodic value α (it is referred to as a "period α", hereafter) based on the detection signal from the encoder sensor 112 was received from the rotational cycle calculation unit 203 (step S601).

The control value generation unit 201 waits until receiving the signal of the period α (NO in the step S601). When receiving the signal of the period α (YES in the step S601), the control value generation unit 201 determines whether the period α falls within a predetermined range (step S602). The predetermined range may be set according to the accuracy required for the color copying machine. For example, when the period α is extremely stable, the range of about ±0.5% of the target period tag is set. On the other hand, the range of about ±80% of the target period tag is set in order to respond a sudden variation of the period α sensitively. Usually, a stable control can be performed by setting the range of about ±3% through ±7% of the target period tag.

When the period α falls within the predetermined range (YES in the step S602), the control value generation unit 201 clears an integral error count N to zero, and sets a control value e to a value (α-tag) that is obtained by subtracting the target period tag from the period α (step S603). Then, the control value generation unit 201 outputs the set control value e to the FB control unit 205 (step S604). It should be noted that the "accumulation error count N" is a count that increases when the period α does not fall within the predetermined range. That is, the count N is an accumulated value that increases when the determination in the step S602 results in "NO". The control value generation unit 201 has a function to hold the accumulated error count N.

When the period α does not fall within the predetermined range (NO in the step S602), the control value generation unit 201 determines whether the accumulation error count N is larger than a predetermined error count err_num (step S605).

When the integral error count N is not larger than the predetermined error count err_num (NO in the step S605), the control value generation unit 201 substitutes zero (0) for the control value e without controlling with the period α, and increments the accumulation error count N by one (step S607). Then, the control value generation unit 201 outputs the set control value e to the FB control unit 205 (step S604).

When the accumulation error count N is larger than the predetermined error count err_num (YES in the step S605), the control value generation unit 201 increments the accumulation error count N by one, and sets the control value e to the value (α-tag) that is obtained by subtracting the target period tag from the period α (step S606). Then, the control value generation unit 201 outputs the set control value e to the FB control unit 205 (step S604).

Figure 7B:
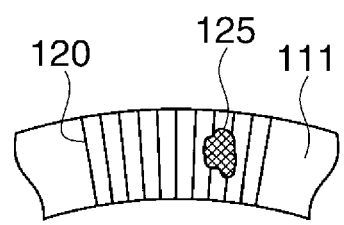
FIG. 7B and FIG. 7C are partial enlarged views showing an encoder wheel shown in FIG. 7A.
Figure 7C:
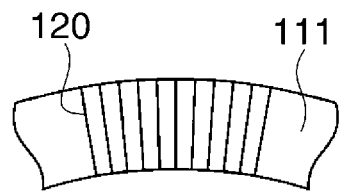

FIG. 7A is a front view of the encoder unit 110. FIG. 7B and FIG. 7C are partial enlarged views of the encoder wheel 111.

When a dust particle (defilement) 125 adheres to the slits 120 formed on the encoder wheel 111 as shown in FIG. 7B, the period α falls outside the predetermined range when the encoder sensor 112 detects the section of dust particle 125, and the determination in the step S602 becomes NO. However, when the encoder sensor 112 detects sections other than the dust particle 125, the period α falls within the predetermined range, and the determination in the step S602 becomes YES. As a result, the accumulation error count N is cleared to zero in the step S603. Accordingly, when the dust particle (defilement) 125 adheres to the slits 120, there is a high possibility that the integral error count N is not larger than the predetermined error count err_num (NO in the step S605). In this case, the control value generation unit 201 determines that the period α outputted from rotational cycle calculation unit 203 is affected by the dust particle 125, and sets the control value e to zero in the step S607. It should be noted that the control value e may be set to a predetermined value other than zero (0) in the step S607.

On the other hand, when it is determined that the period α falls outside the predetermined range in the step S602 even if the encoder wheel 111 is normal as shown in FIG. 7C, it is considered that the load applied to the drum rotating shaft 103 increased. Then, in such a case, the period α continuously varies and it is determined that the accumulation error count N is larger than the predetermined error count err_num in the step S605. Accordingly, in this case, the control value generation unit 201 determines that the period α outputted from the rotational cycle calculation unit 203 is correct, and sets the control value e to "α-tag" in the step S606 like in the step S603 that is executed in the normal time.

Although the step S604 is executed after the step S607 in this embodiment, the process may return to the step S601 directly after the step S607 without executing the step S604. In such a configuration, since the control value e that was determined based on the last period α, which was determined falling within the predetermined range in the step S603, is used as-is, the control value e can be avoided being affected by the dust particle, and the effect equivalent to the above-mentioned embodiment is acquired.

Thus, when the rotation information about the rotating member falls outside the predetermined range and when the count of the determinations that the rotation information falls outside the predetermined range is larger than the predetermined count, the control value e is generated based on the rotation information and it is used in this embodiment. On the other hand, even if the rotation information falls outside the predetermined range, when the count of the determinations that the rotation information falls outside the predetermined range is smaller than the predetermined count, the predetermined control value is used.

FIG. 8A through FIG. 8E and FIG. 9A through FIG. 9E are charts showing concrete operations (signal processes) of the control value generation unit 201 according to the flowchart shown in FIG. 6. FIG. 8A and FIG. 9A show the input waveform to the rotational cycle calculation unit 203 and the operation values; FIG. 8B and FIG. 9B show the accumulation error count N; FIG. 8C and FIG. 9C show the control value e; FIG. 8D and FIG. 9D show the rotational speed of the drum rotating shaft 103; and FIG. 8E and FIG. 9E show the load to the drum rotating shaft 103.

FIG. 8A shows the state where the output waveform from the encoder sensor 112 becomes abnormal in spite of the fact that the drum rotating shaft 103 is rotating at the target speed (target period) actually because the dust particle 125 adheres to the encoder wheel 111 as shown in FIG. 7B. Accordingly, the load to the drum rotating shaft 103 hardly varies as shown in FIG. 8E.

The rotational cycle calculation unit 203 calculates the periods (α) like times T1, T2, T1a, T1b, and T1c in response to the output signal from the encoder sensor 112. Since only the time T2 is abnormal, the determination in the step S605 becomes "NO" when the time T2 is detected. Here, since the integral error count N before detecting the time T2 is "0", the control value e is set to "0" as shown by the solid line in FIG. 8C, and accordingly, the rotational speed of the drum rotating shaft 103 is stabilized as shown by the solid line in FIG. 8D.

On the other hand, if the control value e is changed (e=α-tag) as shown by the broken line in FIG. 8C by reflecting the detection result of the time T2 in FIG. 8A, the rotational speed of the drum rotating shaft 103 will be confused greatly as shown by the broken line in FIG. 8D. The integral error count N becomes "1" when the time T2 was detected, but is cleared to "0" when the time T1a is detected at the next time (see the step S603) as shown in FIG. 8B.

FIG. 9A shows the state where the abnormal periods shown by times T10, T11, T12, T13, and T14 continued because the load to the drum rotating shaft 103 increased as shown in FIG. 9E. Such variation of the load of the drum rotating shaft 103 occurs by friction between the photoconductive drum 11a (11b through 11d) and the cleaning device 15, for example. More specifically, the load variation occurs when the toner on the surface of the photoconductive drum 11a (11b through 11d) diminishes, or when the lubricant applied to the cleaning device 15 decreases.

When such a load variation occurs, the method disclosed in Japanese Laid-Open Patent Publication (Kokai) No. 2005-28607 (JP 2005-28607A) that is previously described as the prior art continuously outputs a constant control value shown by the broken line in FIG. 9C while the periodic abnormality occurs. Thereby, since the actually needed control value cannot be acquired, the rotational speed of the drum rotating shaft 103 continues falling as shown by the broken line in FIG. 9D.

On the other hand, in this embodiment, the accumulation error count N showing the count of occurrences of the periodic abnormality is counted, and the control value e is adjusted in the step S607 when the accumulation error count N becomes larger than the predetermined error count err_num. In the example in FIG. 9A through FIG. 9E, the error count err_num is set to "2". Accordingly, when the times T10, T11, and T12 are detected as three periodic abnormalities continuously as shown in FIG. 9A, the control value e is set to "0" in the periods where the accumulation error count N is "1" and "2", and the control value e is set to "α-tag" when the accumulation error count N becomes "3".

Thus, when the control shown by the solid line in FIG. 9C is performed as a solid line is executed on the load variation shown in FIG. 9E, the rotational speed of the drum rotating shaft 103 decreases apart from the target speed temporarily, and returns to the target speed in comparatively short time as shown by the solid line in FIG. 9D. It should be noted that the error count err_num can be set to an arbitrary count of 1 or more, and it is not limited to "2" mentioned above.

According to this embodiment, the rotational speed of the drum rotating shaft 103 is appropriately controllable according to the circumstances where a dust particle adheres to the encoder wheel 111 or the load to the drum rotating shaft 103 varies etc. Accordingly, since this improves the accuracies of the electrostatic latent images and the toner images formed on the photoconductive drums 11a through 11d and improves the transfer accuracy to the intermediate transfer belt 31d, the image with high precision can be transferred to the transfer sheet P.

Although the embodiments of the invention have been described, the present invention is not limited to the above-mentioned embodiments, the present invention includes various modifications as long as the concept of the invention is not deviated.

Although the photoconductive drums 11a through 11d are taken up as the rotating members in the above-mentioned embodiment, the above-mentioned rotational speed control can also be used for rotation controls of various kinds of rotating members, such as the driving roller 32 for driving the intermediate transfer belt 31 and the various rollers for conveying the transfer sheet P. Although the rotational cycle is used as the rotation information about the rotating member in the above-mentioned embodiment, it is not limited to this but rotational speed, peripheral velocity, etc. may be used.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-035052, filed on Feb. 21, 2012, which is hereby incorporated by reference herein in its entirety.

What is claimed is:

1. A rotary driving apparatus that drives a rotating member comprising:
    a drive unit configured to rotate the rotating member;
    a rotating body configured to be rotated with the rotating member;
    a detection unit configured to detect scales formed on the rotating body;
    a calculation unit configured to calculate rotation information about the rotating member based on the detection result by the detection unit;
    a control unit configured to control the drive unit based on a control value; and
    a control value setting unit configured to set the control value to a predetermined value when the rotation information falls outside a predetermined range and a count of determinations that the rotation information falls outside the predetermined range is smaller than a predetermined count, and to set the control value based on the rotation information when the rotation information falls outside the predetermined range and the count of determinations that the rotation information falls outside the predetermined range is larger than the predetermined count.

2. The rotary driving apparatus according to claim 1, wherein the control value setting unit sets the control value based on the rotation information when the rotation information falls within the predetermined range.

3. The rotary driving apparatus according to claim 2, wherein the control value setting unit clears the count to zero when the rotation information falls within the predetermined range.

4. The rotary driving apparatus according to claim 1, wherein the control unit generates a feedback control amount for feedback control based on the control value, and controls the drive unit based on the feedback control amount.

5. The rotary driving apparatus according to claim 1, wherein the rotation information is one of a rotational cycle, rotational speed, and peripheral velocity of the rotating member.

6. An image forming apparatus that forms an image with an electrophotography system that forms an electrostatic latent image on a photoconductive drum, develops the electrostatic latent image with developer to form a developer image, and transfers the developer image to a transfer sheet, the image forming apparatus comprising:
    a drive unit configured to rotate the photoconductive drum;
    a rotating body configured to be rotated with the photoconductive drum;
    a detection unit configured to detect scales formed on the rotating body;
    a calculation unit configured to calculate rotation information about the photoconductive drum based on the detection result by the detection unit;
    a control unit configured to control the drive unit based on the set control value; and
    a control value setting unit configured to set a control value to a predetermined value when the rotation information falls outside a predetermined range and a count of determinations that the rotation information falls outside the predetermined range is smaller than a predetermined count, and to set the control value based on the rotation information when the rotation information falls outside the predetermined range and the count of determinations that the rotation information falls outside the predetermined range is larger than the predetermined count.

7. A control method for a rotary driving apparatus having a drive unit that rotates a rotating member, and a rotating body that is rotated with the rotating member, the control method comprising:
    a detection step of detecting scales formed on the rotating body;
    a calculation step of calculating rotation information about the rotating member based on the detection result by said detection unit;
    a first determination step of determining whether the rotation information falls within a predetermined range;
    a second determination step of determining whether a count of determinations that the rotation information falls outside the predetermined range is larger than a predetermined count;
    a first setting step of setting the control value to a predetermined value when the rotation information falls outside the predetermined range and the count of determinations that the rotation information falls outside the predetermined range is smaller than the predetermined count;
    a second setting step of setting the control value based on the rotation information when the rotation information falls outside the predetermined range and the count of determinations that the rotation information falls outside the predetermined range is larger than the predetermined count; and
    a driving step of driving the drive unit based on the control value.

8. The control method according to claim 7, further comprising:
    a third setting step of setting a control value based on the rotation information when the rotation information falls within the predetermined range.

9. The control method according to claim 8, wherein the count is cleared to zero in the third setting step.

10. A non-transitory computer-readable storage medium storing a control program causing a computer to execute a control method for a rotary driving apparatus having a drive unit that rotates a rotating member, and a rotating body that is rotated with the rotating member, the control method comprising:
    a detection step of detecting scales formed on the rotating body;
    a calculation step of calculating rotation information about the rotating member based on the detection result by said detection unit;
    a first determination step of determining whether the rotation information falls within a predetermined range;
    a second determination step of determining whether a count of determinations that the rotation information falls outside the predetermined range is larger than a predetermined count;
    a first setting step of setting the control value to a predetermined value when the rotation information falls outside the predetermined range and the count of determinations that the rotation information falls outside the predetermined range is smaller than the predetermined count;

a second setting step of setting the control value based on the rotation information when the rotation information falls outside the predetermined range and the count of determinations that the rotation information falls outside the predetermined range is larger than the predetermined count; and a driving step of driving the drive unit based on the control value.

11. The non-transitory computer-readable storage medium according to claim 10, further comprising:

a third setting step of setting a control value based on the rotation information when the rotation information falls within the predetermined range.

12. The non-transitory computer-readable storage medium according to claim 11, wherein the count is cleared to zero in the third setting step.

\* \* \* \* \*